Patented Dec. 20, 1932

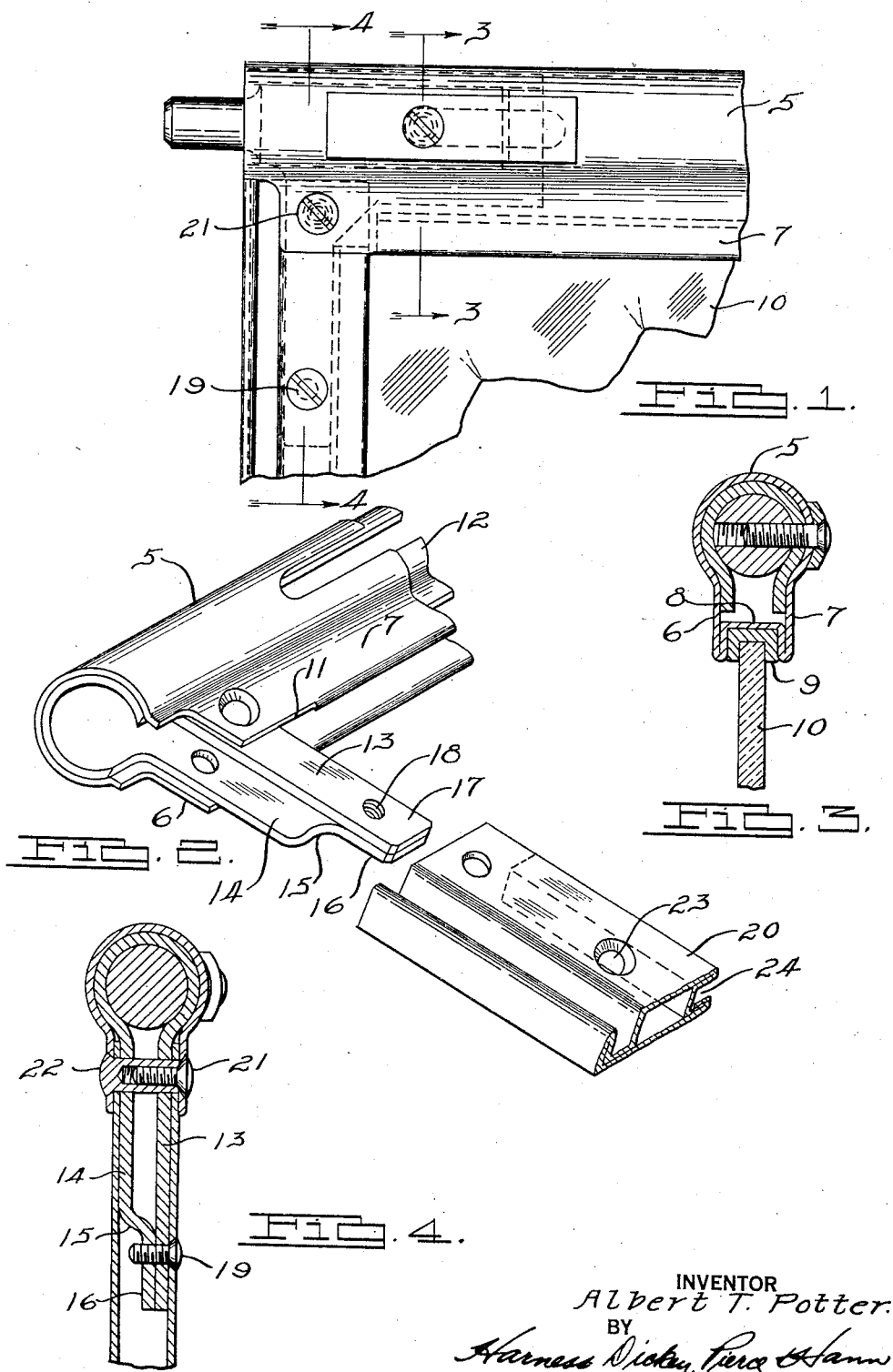

1,891,778

UNITED STATES PATENT OFFICE

ALBERT T. POTTER, OF DETROIT, MICHIGAN, ASSIGNOR TO AINSWORTH MANUFACTURING COMPANY, A CORPORATION OF MICHIGAN

CORNER CONSTRUCTION FOR FRAMES

Application filed March 10, 1930. Serial No. 434,554.

This invention relates to corner constructions for frames and particularly those used for windshields of automobiles.

The main objects of this invention are to provide an improved corner construction of windshield frame which will have great strength and rigidity; to provide a combined attaching brace and reinforcing member which will give added strength to a frame corner; and to provide a construction which will be neat in appearance, simple in construction and economical to manufacture.

An illustrative embodiment of this invention is shown in the accompanying drawing, in which:

Fig. 1 is a fragmentary view in elevation of one corner of a windshield frame constructed according to my invention.

Fig. 2 is a view in perspective of the same with one of the frame members removed and in spaced relation to the bracket to which it is attached.

Fig. 3 is a sectional view taken on the line 3—3 of Fig. 1, looking in the direction indicated by the arrows.

Fig. 4 is a sectional view taken on the line 4—4 of Fig. 1, looking in the direction indicated by the arrows.

In the construction shown in the drawing, a sheet metal hollow frame member 5 is shaped to provide a pair of spaced parallel walls 6 and 7, the outer edges of which are bent back upon themselves and then transversely thereto to form a substantially U-shaped glass run or channel 8. A channel-shaped rubber gasket 9 is mounted in the channel 8 to support a windshield glass 10 in the usual manner.

The glass run 8 is cut away adjacent the terminating end of the frame member 5 so as to provide an open-ended slot 11 in alignment with the glass run and bounded at either side of the ends of the walls 6 and 7.

A reinforcing brace member comprising a piece of sheet metal bent to form a tubular portion 12 and a pair of spaced parallel transversely extending arms 13 and 14 is adapted to fit within the hollow end of the frame member 5 with the arms 13 and 14 extending through the slot 11 in spaced parallel relation to the side walls 6 and 7. The outside contour of the brace portion 12 is substantially the same as the inside contour of the hollow end of the frame member 5 so that said portion fits snugly within said hollow end.

The outer end of the arm 14 is offset at 15 so that the end 16 thereof lays against the outer tip end 17 of the arm 13. These contacting ends are drilled and tapped in registry, as shown at 18, for receiving a screw 19.

A second sheet metal frame member 20 of substantially rectangular hollow cross-section is adapted to be fitted over the arms 13 and 14 in snug relationship with the end side walls thereof fitting underneath the ends of the parallel walls 6 and 7 so as to be overlapped thereby.

These overlapping end walls of the members 5 and 20 and the arms 13 and 14 of the brace member are all drilled in registry to receive co-operating attaching screws 21 and 22. The frame member 20 is provided with a hole 23 through which passes the attaching screw 19. The inner edge of the frame member 20 is provided with a glass run 24 in the usual manner, which is cut away adjacent the end so the metal of transversely extending ends may be of greater width at the inside corner to compensate for the screw holes.

In the construction and assembly of this frame, the sheet metal brace member having the tubular portion 12 and arms 13 and 14 is slid into the open end of the frame member 5 with the arms 13 and 14 extending through the slot 11.

The frame member 20 is then slipped over the arms 13 and 14, which fit snugly therein, until the holes for the screws 21 and 22 in both frame members and brace arms are all in registry. Screws are then passed through the respective holes and thus secure the two frame members together. The portion 12 of the brace member which fits within the frame member 5 may be welded to said frame member, if desired, although this welding is not essential.

By the use of this construction a lighter weight gauge of metal may be utilized for the construction of the frame members than has heretofore been possible by reason of the brace portion 12 extending well within the frame members 5 and contacting with a relatively large area thereof, thus distributing the strain over a relatively large area of the metal in the frame member. It will be understood, of course, that the frame member 5 has considerably greater strength and rigidity at all points inward from the inner end of the slot 11 and the portion 12 of the brace member extends well within this area of the frame member where the metal has not been cut away at the glass run or channel.

By reason of the sheet metal portion 12 being within the frame 5, a smaller trunnion plug is required than heretofore, and on account of the arms 13 and 14 being in spaced relation to the side walls 6 and 7, there is a relatively small gap between the arms and consequently only a small area of the trunnion plug is not supported.

Although but one specific embodiment of this invention has been herein shown and described, it will be understood that numerous details of the construction shown may be altered or omitted without departing from the spirit of this invention as defined by the following claims.

I claim:

1. In a corner construction for frames, a sheet metal frame member having a hollow end and a pair of spaced parallel sides forming a glass channel, said hollow end having an open-ended slot in alignment with said glass channel, a reinforcing brace member having a portion housed within and secured to said hollow end, a transversely disposed portion on said brace member extending through said slot and embraced by the walls thereof, and a second frame member secured to said transversely extending portion.

2. In a corner construction for frames, a sheet metal frame member having a hollow end and a pair of spaced parallel sides forming a glass channel, said hollow end having an open-ended slot in alignment with said glass channel, a reinforcing brace member having a portion housed within and secured to said hollow end, a transversely disposed portion on said brace member extending through said slot and embraced by the walls thereof, a second frame member having a hollow end for receiving said transversely extending portion, and means for securing said portion within said hollow end.

3. In a corner construction for frames, a sheet metal frame member having a hollow end, a reinforcing brace member comprising a piece of sheet metal bent to form a portion to fit within said hollow end, a pair of transversely disposed arms on said brace member extending in spaced parallel relationship, a second frame member having a hollow end for receiving said transversely disposed arms, and means for securing said arms within said hollow end.

4. In a corner construction for frames, a sheet metal frame member having a hollow end, said end having an open-ended slot therein, a reinforcing brace member comprising a piece of sheet metal bent to form a portion to fit within said hollow end, a pair of transversely disposed arms on said brace member extending through said slot in spaced parallel relationship, a second frame member having a hollow end for receiving said transversely disposed arms, and means for securing said arms within said hollow end.

5. In a corner construction for frames, a sheet metal frame member having a hollow end, a reinforcing brace member comprising a piece of sheet metal bent to form a portion to fit within said hollow end, a pair of transversely disposed arms on said brace member extending in spaced parallel relationship, a second frame member having a hollow end for receiving said transversely disposed arms, the outer end of one of said arms being offset to lay against the outer end of the other of said arms, and fastening means passing through both of said ends for securing said arms within said hollow end.

6. In a corner construction for frames, a sheet metal frame member having a hollow end and a pair of spaced parallel sides forming a glass channel, said hollow end having an open-ended slot in alignment with said glass channel, a reinforcing brace member comprising a piece of sheet metal bent to form a portion to fit within said hollow end, a pair of transversely disposed arms on said brace member extending through said slot in spaced parallel relationship and embraced by the side walls of said slot, a second frame member having a hollow end for receiving said transversely disposed arms, the outer end of one of said arms being offset to lay against the outer end of the other of said arms, and fastening means passing through both of said ends for securing said arms within said hollow end.

ALBERT T. POTTER.